United States Patent
Takahashi et al.

[15] 3,671,941
[45] June 20, 1972

[54] APPARATUS FOR JUDGING AND PROCESSING BRANCHES AND OR CROSSINGS FOR USE IN AUTOMATIC CURVE TRACING SYSTEM

[72] Inventors: Tadashi Takahashi; Masatoshi Miyazaki, both of Sendai; Yasuhiko Ogawa, Natori; Tadashi Sato; Kazuhiko Kakuta, both of Tokyo, all of Japan

[73] Assignee: Iwatsu Electric Company, Ltd., Suginamiku, Tokyo, Japan

[22] Filed: May 28, 1970

[21] Appl. No.: 41,172

[30] Foreign Application Priority Data

| May 31, 1969 | Japan | 44/42073 |
| May 31, 1969 | Japan | 44/42074 |
| May 31, 1969 | Japan | 44/42075 |
| May 31, 1969 | Japan | 44/42076 |

[52] U.S. Cl. ..................340/172.5, 340/146.3 AE
[51] Int. Cl. ...........................................G06k 11/02
[58] Field of Search..........340/172.5, 146.3 AE; 33/1 M

[56] References Cited

UNITED STATES PATENTS

| 3,245,036 | 4/1966 | Grottrup | 340/146.3 AE |
| 3,383,516 | 5/1968 | Leimer | 340/146.3 AE |

OTHER PUBLICATIONS

" Computer Simulation of a Character–Recognition Machine," Part 1, by E. S. Deutsch, reprinted from Post Office Electrical Engineers' Journal, Vol. 60, No. 1, pp. 39– 44, April 1967.

Primary Examiner—Gareth D. Shaw
Attorney—Chittick, Pfund, Birch, Samuels & Gauthier

[57] ABSTRACT

In an automatic curve tracing system wherein an area containing a curve to be traced is scanned by a detector and the detector is moved successively according to a positional information obtained by the scanning operation, there is provided apparatus for judging a branch and or crossing including means to judge whether the branch and or crossing are included or not in the scanning area and means to store the result of the judgement while the same branch and or crossing are contained in the subsequent scanning area.

7 Claims, 11 Drawing Figures

FIG. 1

TADASHI TAKAHASHI
MASATOSHI MIYAZAKI
YASUHIKO OGAWA     INVENTORS
TADASHI SATO
KAZUHIKO KAKUTA

TADASHI TAKAHASHI
MASATOSHI MIYAZAKI
YASUHIKO OGAWA    INVENTORS
TADASHI SATO
KAZUHIKO KAKUTA

TADASHI TAKAHASHI
MASATOSHI MIYAZAKI
YASUHIKO OGAWA
TADASHI SATO
KAZUHIKO KAKUTA

INVENTORS 3,671,941

APPARATUS FOR JUDGING AND PROCESSING BRANCHES AND OR CROSSINGS FOR USE IN AUTOMATIC CURVE TRACING SYSTEM

CROSS REFERENCE TO RELATED APPLICATIONS

This application is related to applications filed of even date herewith, Ser. Nos.: 41,297, 41,296, 41,291 and 41,471, all assigned to the assignee of the present invention.

BACKGROUND OF THE INVENTION

This invention relates to apparatus for judging and processing branches and or crossings of a curve for use in an automatic curve tracing system, and more particularly to a novel apparatus for judging and processing branches and crossings of a curve being traced from a group of outputs of a detector when it performs a round scanning operation when tracing a curve depicted on a sheet of drawing.

In many fields of engineering it is highly desirable to trace various curves depicted on a sheet of drawing to convert them into digital electrical signals. Such requirements arise when it is desired to analyze such waveforms as cardiograms, brain waves, and earthquake waves and to recognize patterns. At present, when supplying various data curves to a universal electronic computor and the like, the data curves are converted into machine terms with a large labor and time and the converted information is applied to the input device of the computor.

In such a case the curve to be traced often includes branches and or crossings and unless such branches and crossings are correctly judged and processed, accurate tracing of the curve can not be realized.

SUMMARY OF THE INVENTION

It is therefore an object of this invention to provide a novel apparatus which can correctly judge a branch and or crossing of a curve to be traced.

A further object of this invention is to provide a novel apparatus which can correctly judge a particular branch and or crossing of a curve to be traced among a plurality of branches and or crossings.

Another object of this invention is to provide a novel apparatus which can correctly judge a particular branching and or crossing curve after a detector has made a tracing operation in a given direction and returned to a branching and or crossing position of said curve.

A further object of this invention is to provide a novel apparatus which can correctly trace a particular branching curve after a detector has made a tracing operation in a given direction and returned to a branching and or crossing point of said curve.

A still further object of this invention is to provide a novel apparatus which can forbid to trace another branching and or crossing processing while a detector is tracing a branching and or crossing curve.

Another object of this invention is to provide a novel apparatus which can correctly discriminate a branching point and a crossing point.

The automatic curve tracing system comprises a detector which scans an area including a curve to be traced to detect the presence or absence of the curve in said area and generates an electric signal and means responsive to this signal to determine a direction in which the detector is to be directed. To obtain positional information regarding presence or absence of the curve the detector is actuated to perform a round scanning operation along the periphery of the area. Then, in response to the positional information the detector is moved over a predetermined distance in a predetermined direction to trace the curve. Such an incremental tracing operation is repeated sequentially to continuously trace the curve.

To detect the presence of a branch or branching point in the curve there are provided means to determine whether the output information from the detector at a particular point of a curve includes information regarding a branch or not and means to store the result of judgement during subsequent scanning operation of an area including the branch at the particular point so as to perform only one processing for one branch. This prevents duplicate processing of the same branch thus assuring correct tracing. Further, there are provided means to store information regarding the direction of a branch or crossed curve when a branching point or crossing point is reached during continuous tracing of the curve and means to provide information to determine a branch or crossed curve to be traced when an area including such a branch or crossing is scanned.

There are also provided means to store information regarding commencement of the tracing operation of a branch or crossing each time the scanning operation including such a branch or crossing is initiated and means to erase this information each time the scanning area no longer contains such a branch or crossing. This also prevents duplicate scanning or processing operation of the same branch or crossing thus enabling accurate tracing operation of the curve.

The apparatus further includes meanS to determine representative points of respective groups of points obtained by the scanning operation, means to discriminate whether said representative points are tracing directions or tracing forbidding directions and means to determine the phase relationship between representative points produced at each scanning operation. The phase relationship is used to discriminate a crossing point so that there is no fear of mistaking a branching point for a crossing point. Further, there are provided means to assign numerical values to the group of points obtained by the scanning operation, said numerical values corresponding to the position of the group of points, and means to sequentially determining the magnitude of the numerical value of the representative points of respective groups of points by proper combinations for the purpose of determining the phase relationship to readily determine a crossing point.

BRIEF DESCRIPTION OF THE DRAWINGS

The invention can be more fully understood from the following description when taken in conjunction with the accompanying drawings in which.

DESCRIPTION OF THE PREFERRED EMBODIMENT

Figure 1:
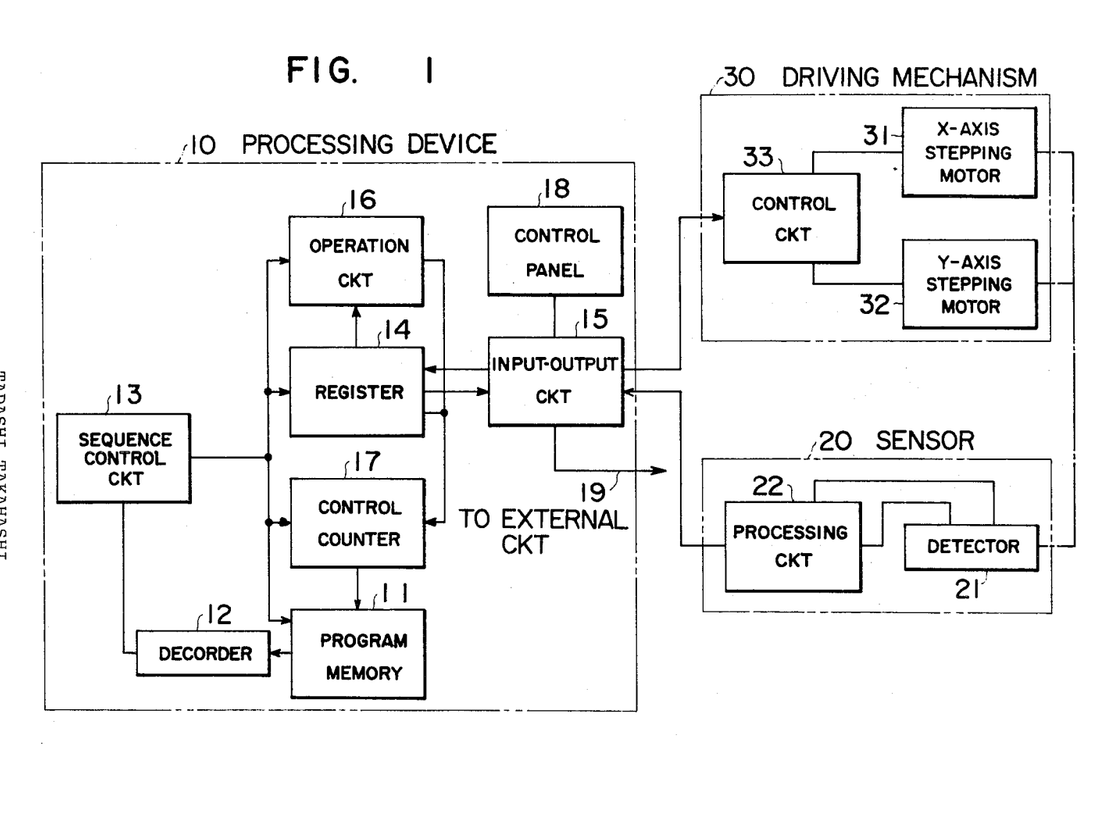
FIG. 1 is a block diagram of an automatic curve tracing system including apparatus for judging and processing crossing and branches embodying this invention.

This system shown in FIG. 1 comprises a processing device 10, a sensor 20 and a driving mechanism 30. Sensor 20 reads the positional information of a curve to be traced and depicted on a sheet of drawing and sends this information to the processing device 10 which suitably processes the information to provide digital signals. The driving mechanism 30 is actuated in accordance with the digital signals to move sensor 20 in a predetermined direction over a predetermined distance. The sensor 20 reads the positional information of the curve or pattern at the new position. This cycle of operation is sequentially repeated to perform automatic tracing of the curve. The digital signal produced at each scanning operation is sent to an electronic computer and the like not shown.

Figure 2:
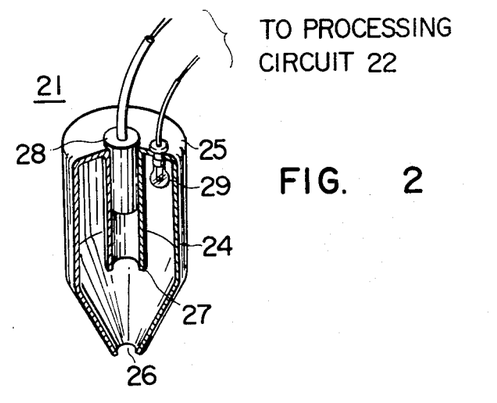
FIG. 2 is a perspective view, partly in section, of a detector utilized in the system shown in FIG. 1.

The detail of each component part will now be described hereunder. Sensor 20 comprises a detector 21 which operates to convert the tone, or white and black of the pattern of the drawing into an electric signal and a processing circuit 22 to suitably process the output from detector 21. In this example detector 21 is shown as an photoelectric detector of the construction shown in FIG. 2. As shown in FIG. 2, detector 21 comprises an opaque cylindrical casing 24 having a closed upper end 25 and a frustoconical bottom with an opening 26, a cylinder 27 concentrically disposed in the casing 24 with an upper end connected to upper end 25 and a lower end terminated slightly above the opening 26, a light receiving element, i.e. a photoelectric converting element 28 contained in cylinder 27 and a source of light 29 disposed in the space defined between casing 24 and cylinder 27. Consequently, under the operating condition of the sensor 20, light is projected from source 29 to outside through opening 26 and the projected light reflected by the pattern is received by the photoelectric converting element 28 to produce an electric signal.

The processing circuit 22 operates to shape the waveform of the signal supplied from photoelectric converting element 28 to judge white and black to provide a binary output of "1" or "0", for example the former corresponding to white and the latter to black.

The driving mechanism 30 comprises two stepping motors 31 and 32 a control circuit 33 which controls these motors in response to a signal supplied from a processing device as described later in more detail.

Figure 3:
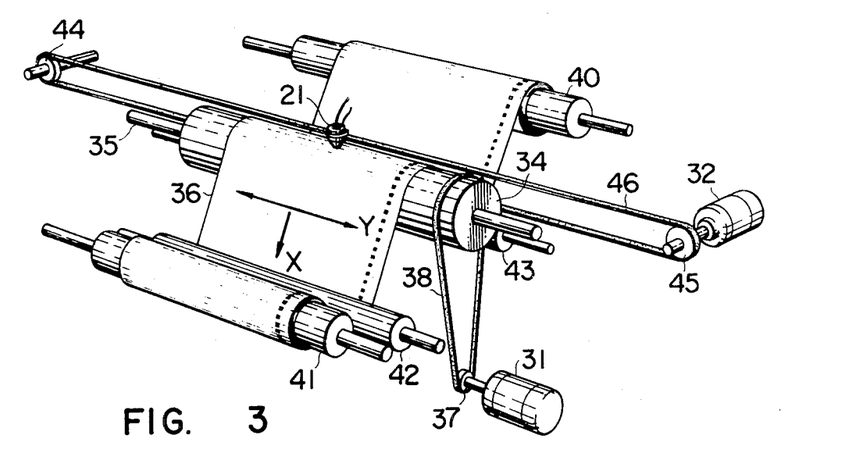
FIG. 3 is a perspective view to illustrate one example of a driving mechanism and the relationship between the detector and a sheet of drawing carrying a curve to be traced.

As shown in FIG. 3 in more detail the driving mechanism includes a rotary drum 34 having a shaft 35 and a recording paper 36 described with a pattern or curve to be traced is passed over the periphery of rotary drum 34. The drum 34 is driven by the X-axis stepping motor 31 through a belt 38 to drive the recording paper in the direction X. The recording paper 36 is driven between a pay out reel 40 and a take-up reel 41 and is urged against the periphery of drum 34 by a pair of guide rollers 42 and 43. Detector 21 is connected to a point of an endless belt 46 passing about pulleys 44 and 45. The detector 21 is disposed to direct its bottom opening toward the axis of drum 34 and is moved in parallel therewith or in the direction of Y. Pulley 45 is driven by the Y-axis stepping motor 32. Either of motors 31 or 32 steps a definite angle each time it receives a pulse from control circuit 33 so as to make relative movement between recording paper 36 and detector 21 over a definite distance corresponding to one step of the motor, for example 0.1 mm. In this manner, the driving mechanism 30 has similar construction and operation as a conventional incremental X–Y plotter.

As shown in FIG. 1, the processing device 10 comprises a program memory 11 storing a program required to scan and trace the pattern, a decoder 12 to read the program supplied by program memory 11, a sequence control circuit 13 responsive to the output of decoder 12 to control the operative sequence of various devices to be described later, and a group of registers 14 comprised by a plurality of serially connected shift registers, for example. Most of the registers function to temporally store a signal to be supplied or received from an input-output circuit 15 while remaining shift registers store constants, modes, memory addresses and return addresses. These shift registers are operated by a sequence control signal supplied from the sequence control circuit 13. An operation circuit 16 is provided to perform an addition, subtraction, logical product and logical addition operations by utilizing signals supplied from registers 14. Selection of the type of the operation is performed by an operation sequence control signal supplied from sequence control circuit 13. The processing device 10 further comprises a control counter 17 which designates an address of the memory 11 storing the program. For example, the counter accomodates the content of the field indicating the destination of the jump when it receives a jump order, but accommodates the content of the return address shift register of the group of registers when the order is returned from a subroutine. Also a control panel 18 including various switches and indicators for controlling the system is associated with the input-output circuit 15.

The system shown in FIG. 1 operates as follows: Upon depression of a start switch, not shown, on the control panel 18, various devices start to operate. Thus, detector 21 of sensor 20 begins to trace a curve or pattern in accordance with the program stored in memory 11. More particularly, detector 21 performs a round scanning operation along the periphery of a substantially square area including the curve to be traced. As used herein the term "a round scanning" means a scan path around the periphery of a designated elemental area. Such a round scanning operation can be effected by a proper control of stepping motors 31 and 32 of the driving mechanism 30 by control circuit 33. The number of spots to be plotted by one round scanning operation may be selected to any desired number according to the instruction from control panel 18. In the example shown in FIG. 4, the number of spots is 10 in the X-axis direction, and ten in the Y-axis direction, thus there are a total of 40 spots plotted by each round scanning operation.

Figure 4:
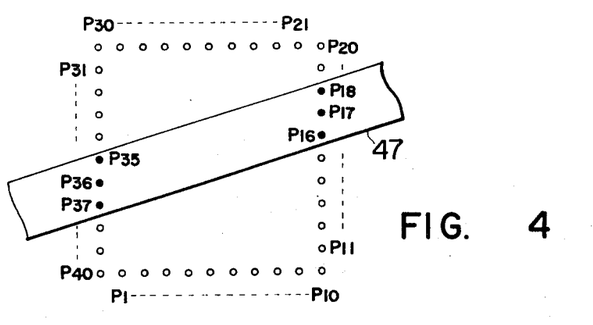
FIG. 4 is a diagram to explain a round scanning operation of the detector to trace the curve and the output of the detector or a processing circuit.

The operation of various parts when tracing a typical curve on the recording paper will now be described. With reference to FIG. 4 showing the operation of detector 21 when it traces a curve 47 depicted on the recording paper 36, $P_1$, $P_2$ ... $P_{40}$ show spots scanned by the detector 21 when it performs a round scanning operation relative to recording paper 36. White and black dots shown at these scanning spots show the result of judgement of the processing circuit 22 when it processes the output from detector 21. More particularly, a white dot at spot $P_1$ shows that the result of the judgement of processing circuit 22 made on the output of detector 21 when it scans spot $P_1$ is "white" and a black dot at spot $P_{16}$ shows that the result of the judgement of processing circuit 22 made on the output of detector 21 when it scans this spot is "black." The result "black" means that there is a pattern of some configuration at that spot. Accordingly, in the example shown in FIG. 4 it is clear that there is a pattern lying on spots $P_{16}$, $P_{17}$, $P_{18}$ and spots $P_{35}$, $P_{36}$, $P_{37}$. In this manner, curve 47 is traced according to the information of these two groups of spots and other information obtained at the time of previous scanning operation. These two groups of spot information are supplied to registers 14 from processing circuit 22 via input-output circuit 15 of the processing device and stored in registers 14. Information stored in these registers is operated and processed by operation circuit 16 in accordance with a prescribed program. More particularly, of said two groups of spots, spots $P_{17}$ and $P_{36}$ situated close to the center of the width of curve 47 are first determined. These spots closely positioned to the center can be determined by calculating the mean value of the maximum and minimum numbers of the plots of each group. The value obtained is stored in registers. These spots $P_{17}$ and $P_{36}$ represent the direction in which curve 47 lies and either one of them indicates the direction to be traced. In order to determine which one of the spot information regarding the centers of respective groups dictates the direction of tracing, the direction of the previous tracing has been stored in the registers 14. Thus, the directional information most close to the previous tracing direction is judged to be the tracing direction. Thus, in the subsequent scanning operation this direction is treated as the previous tracing direction. The tracing forbidding direction is treated in the same manner. Generally, it is considered that the center of the round scanning area is situated on curve 47.

Figure 5:
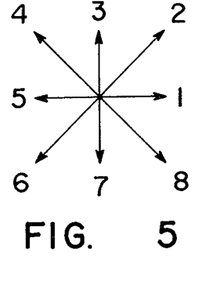
FIG. 5 shows one example of a number of predetermined reference directions utilized to determine the direction of tracing of the detector.

A method of determining the direction in which detector 21 is to be traced will now be described in detail with reference to FIG. 5. As shown in FIG. 5, eight reference directions are predetermined which are coded as "1" "2" . . . "8" in the clockwise direction. Assuming now that spot $P_{17}$ represents the direction to be traced, this direction is made to correspond to reference direction "1" so as to send an output corresponding to direction "1" to control circuit 33 of the driving mechanism 30 over input-output circuit 15 from registers 14. The positional information of spot $P_{17}$ is stored in registers 14. Since there are 40 spots to be plotted and having each a number as shown in FIG. 4, the number of spot $P_{17}$ is to be stored and this information is utilized as the previous tracing direction during a succeeding scanning operation.

Figure 6:
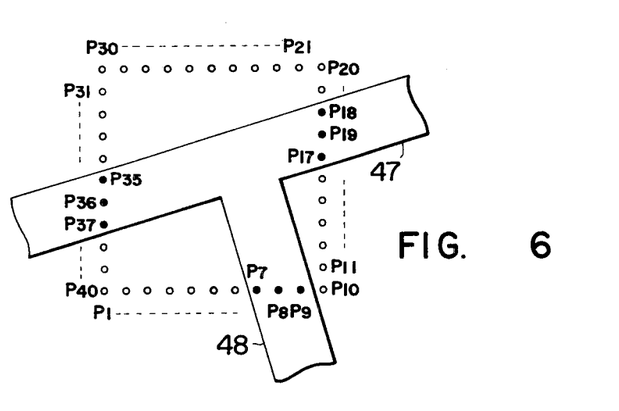
FIG. 6 is a diagram similar to FIG. 4 where the curve includes a branch.

FIG. 6 is a diagram to explain the tracing operation when curve 47 includes a branch 48. In this case information is obtained showing that the curve lies on spots $P_{35}$, $P_{36}$, $P_{37}$, $P_{16}$, $P_{17}$, $P_{18}$; and $P_7$, $P_8$, $P_9$. Similar to the case shown in FIG. 4, processing device 10 determines informations regarding spots $P_{36}$, $P_{17}$ and $P_8$ near the centers of the groups from these three groups of data, and these informations are compared with the information regarding the previous tracing direction to determine which direction corresponds to the tracing direction. Thus, a signal is sent to the driving mechanism 30 to perform the tracing operation in the direction thus determined. In this case, in addition to information regarding the tracing direction and the previous tracing direction information regarding spot $P_8$ is also obtained. This information shows that there is a branched or crossing curve thus forcing processing device 10 to perform a different operation. When the tracing direction at each tracing or scanning operation is denoted by a code "2, 2, 1, 3, 1 . . ." this information will represent the configuration of the curve.

Figure 7:
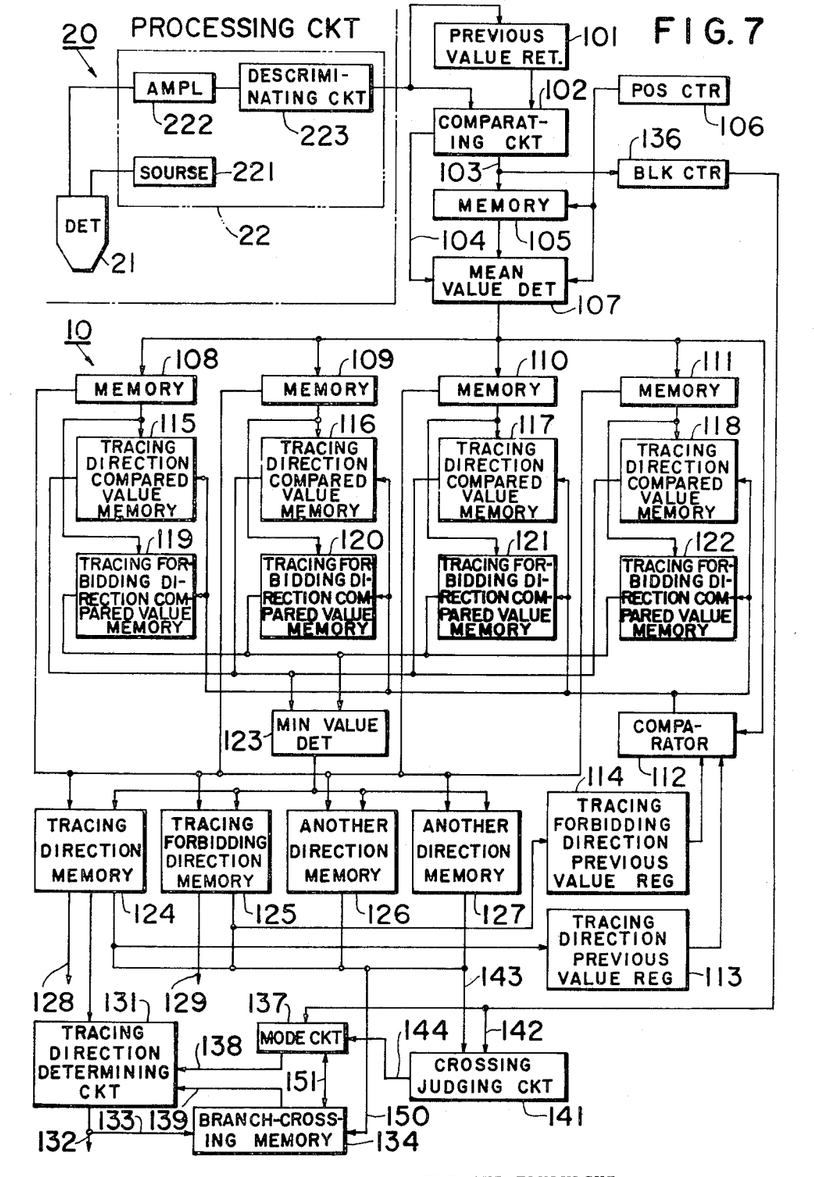
FIG. 7 is a block diagram wherein various program operations of the system shown in FIG. 1 are replaced by hardware.

The above described operation can be better understood from the following description with reference to the block diagram shown in FIG. 7 wherein various operations which are processed according to a prescribed program in FIG. 1 are replaced by hardware. FIG. 7 also shows processing device 10 and sensor 20.

In FIG. 7, source of light 27 (see FIG. 2) of detector 21 is shown as being connected to source 221 of processing circuit 22. Processing circuit 22 comprises a DC amplifier 222 and a discriminating circuit 223 responsive to the output from amplifier 222 to judge white and black. As above described, discriminating circuit 223 provides a "1" output when the spot is white whereas a "0" output in the case of the black spot. The output from discriminating circuit 223 is supplied to a previous value retainer 101 of the processing device 10. The output is also supplied to a comparator circuit 102 which compares the output from previous value retainer 101 with the output from the discriminating circuit 223. As a result of the comparison of these two outputs when the tracing information changes from white to black a "1" output will be supplied to conductor 103 whereas when the tracing information changes from black to white a "1" output will be sent to conductor 104. The "1" output on conductor 103 is stored in a memory 105. At the same time memory 105 also stores a positional information of detector 21 sent from a position counter 106. This condition corresponds to a condition wherein the detector 21 is moved from spot $P_6$ to spot $P_7$ in FIG. 6. As the detector 21 is moved further and when comparator circuit 102 again detects the change from black to white, a "1" output is sent to a mean value determining circuit 107 over conductor 104. This condition corresponds to the movement of the detector from spot $P_9$ to spot $P_{10}$, for example, in FIG. 6. As a consequence, at this time the mean value determining circuit 107 determines the mean value of the previous positional information of detector 21 which has been stored in memory 105 and the present positional information of detector 21. In this manner, the positional information of the spot near the center is determined while detector 21 is detecting "black." This center point corresponds to $P_8$, for example, in FIG. 6. This mean value is stored in either one of memories 108 through 111, for example, memory 108. When additional mean value information is sent during one round scanning operation, these data are stored in other memories such as 109, 110.

A portion of the mean value information is sent to a comparator 112 where it is compared with information from a tracing direction previous value register 113 and tracing forbidding direction previous value register 114 and the result of comparison is successively sent to a tracing direction compared value memories 115 to 118 and tracing forbidding direction compared value memories 119 to 122 and stored in these memories. Data sent to respective tracing direction compared value memories 115 to 118 are sent to a minimum value detector 123 where their minimum value is detected. Data stored in memories 108 to 111 and corresponding to this minimum value show a value most close to the previous tracing direction. In the same manner, minimum value detector 123 detects the minimum value stored in the tracing forbidding direction compared value memories 119 to 122 so as to select information of a direction corresponding to the minimum value from memories 108 to 111. These values are sent to a tracing direction memory 124 and a tracing forbidding direction memory 125 and stored therein. Data regarding other directions are sent to other direction memories 126 and 127. The output from memory 124 is sent to input-output circuit 15 shown in FIG. 1, for example, over conductor 128. The output from input-output circuit 15 is sent to an external circuit (not shown) over conductor 19 and to the control circuit 33 of driving mechanism 30 so as to cause either one or both of stepping motors 31 and 32 to rotate one step to move one step either one or both of detector 21 and recording paper 36. At each round scanning operation, information in previous value registers 113 and 114 is changed. The above described cycle of operation is repeated to perform continuous tracing of the curve.

Where a branch or crossing appears during the tracing operation, after completion of the tracing in one direction, the detector is returned to the branching point or crossing to start a new tracing operation in the direction in which the branch lies. The operation of the system where a branch appears during tracing will now be given with reference to FIG. 10.

Figure 10:
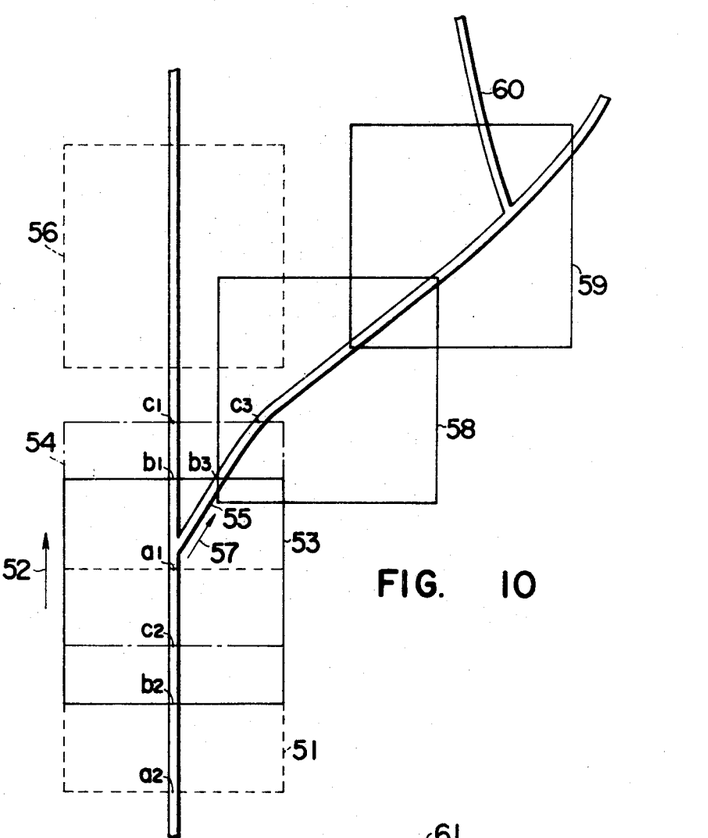
FIG. 10 is a diagram to show the relationship between a curve and the scanning areas of the detector to explain the judging and processing operations of a branch and a crossing.

First, it is assumed that an area 51 is scanned at a certain time and a spot $a_1$ of plotted spots $a_1$ and $a_2$ is determined to represent the direction to be traced. Then the tracing is effected in the direction of an arrow 52 and the next scanning is performed for an area 53. The spots plotted at this time are a group of spots $b_1$, $b_2$ and $b_3$. Thus, the number of spots plotted increases from two to three. As a result, spot $b_1$ is determined to represent the tracing direction and information regarding thereto is stored in tracing direction memory 124 whereas spot $b_2$ is judged to represent a tracing forbidding direction and information regarding thereto is stored in tracing forbidding direction memory 125.

The information regarding the remaining spot $b_3$ is stored in memory 126. The output from memory 124 is supplied to a tracing direction determining circuit 131 which functions to represent information which has been determined as the tracing direction during a round scanning operation of a curve, or the output information of the tracing direction memory 124 in terms of one of eight predetermined reference directions shown in FIG. 5 so as to provide a corresponding output for conductor 132. Where a branch is present as above assumed, information regarding thereto will be stored in a branch-crossing memory 134 through conductors 133 and 150. It is noted that the information to be stored in the memory 134 is information representing the position of branching point as well as the direction of the branch line. The information is necessary for the detector to return to the branching point after the completion of tracing in one direction. Therefore this information represents the difference in two-dimension coordinate between the position of the detector at a respective point in the tracing operation and the branching position. Accordingly the information regarding the position of the detector is corrected at every tracing operation of the detector. The remaining information regarding to the direction of the branching line is represented by a direction of the line which has been detected by the detector at said round scanning operation.

Thereafter the scanning operation is shifted from area 53 to area 54. By the scanning operation of area 54 three spots are plotted as in the case of area 53. In this case, however, spot $c_3$ represents a branch line 55 so that if this spot $c_3$ were processed again a duplicate processing will be resulted. For this reason, block counter 136 is provided which is connected to output conductor 103 of comparator circuit 102 to count the number of spots plotted during the round scanning operation. The output from block counter 136 is utilized to switch the operation mode of a mode circuit 137 to a mode designating the branch processing operation. Thus, the output from mode circuit 137 is sent to branch-crossing memory 134 over conductor 151 so that this memory 134 is prohibitted from being supplied with new information from tracing direction determining circuit 131 even when the succeeding round scanning operation detects more than two spots.

During repeated scanning and tracing operations when the block counter 136 detects that the number of spots detected by one round scanning operation has varied from three to two, as for example when area 56 is scanned, mode circuit 137 switches its mode of operation back to the original simple curve tracing mode. Thus, the mode circuit 137 provides information to branch-crossing memory 134 when another branch appears. In this manner, only one branch processing operation is performed for one branch. Such a branch processing operation may be made by any one of following three methods:

1. To process a branch during the first scanning operation in which the branch has been found and thereafter, so long as information regarding this operation is being sent out, branch processing operation is forbidden even when the number of spots plotted during scanning increases from two to three.
2. To process a branch at a time when the information regarding branch processing is erased.
3. To perform the branch processing only when the center of the scanning area approaches to the true branching point during which the branching processing is being stored.

In this manner, after completing the tracing operation in one direction, the detector is returned to the position of one of the branches that have been stored in branch-crossing memory 134. Of course such a return motion is effected by the information previously stored in the memory 134. Similar operations are also performed for processing crossings.

As the detector is returned to a branch or crossing it is necessary to investigate a portion of the curve containing such branch or crossing.

Figure 8:
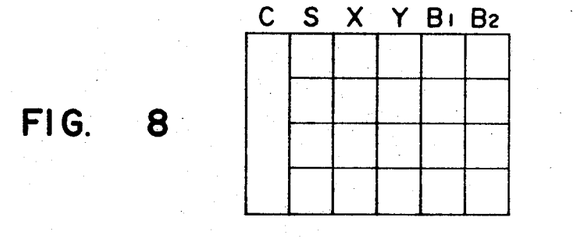
FIG. 8 is a diagram to show a construction of the branch-crossing memory circuit shown in FIG. 7.

To understand this operation, the construction and operation of the branch-crossing memory 134 will be described in detail. To trace a curve including N branches and or crossings, the memory must include N memory units. As diagrammatically shown in FIG. 8 the memory comprises units X and Y to store the positional relationship between the present tracing point and a particular branch or crossing, units $B_1$ and $B_2$ to store the direction in which a curve to be traced next time lies when the particular branch or crossing is detected, a unit S to store information regarding whether above described memory units are vacant or filled, or whether a branch or crossing is stored therein and a memory control C adapted to select vacant units to store therein necessary information or to erase information which become unnecessary, said memory control being a portion of a control circuit common to all memory units. When the detector is returned to a branch or crossing as above described, information regarding memory units X AND Y which store such branch or crossing are sent to tracing direction determining circuit 131 over conductor 139. On the other hand, upon finding a branch or crossing, an information regarding the tracing direction which is determined by a subsequent scanning operation is represented by one of the eight reference directions and this direction is added to memory units X and Y to correct two-dimensional direction from the branching or crossing point.

Accordingly, as the detector is returned to a branching or crossing point after the tracing operation in one direction has been completed, information stored in memory units $B_1$ and $B_2$ of the branch-crossing memory 134 is utilized to discriminate a branch or crossed curve at that point (a branch 55, shown in FIG. 10) so as to commence tracing thereof. Should the direction of a branch or crossed curve not be stored in branch-crossing memory 134 it would be impossible for the detector to determine which curve is the crossed curve or branched curve to be traced when the detector is returned to the branching or crossing point. This is so because when a curve is traced beyond such point as the present racing direction and previous tracing direction are stored, it is possible to discriminate the direction of a particular branch or crossing whereas when the detector is returned to a branching or crossing point by utilizing coordinate values thereof information regarding the present and previous tracing directions of the curve are not available.

Referring again to FIG. 10, at the commencement of the tracing operation of a particular branch, the scanning area may contain the branching point at which the tracing operation has initiated. Such a condition can be understood by considering that scanning area 54 (FIG. 10) represents the area at the time of initiating the tracing operation in the direction of arrow 57. Under these circumstances spots $c_1$ and $c_2$ have already been traced. For this reason, to prevent duplicate branch processing operation when the detector is returned to a branching point, mode circuit 137 provides an output indicating the branch processing operation for the branch-crossing memory 134 over conductor 151 until the detector is moved away from the particular branching point to a point at which its scanning area does not contain it. Such a point corresponds to a scanning area 58, for example, in FIG. 10.

In this manner, branch 55 is traced and upon reaching a scanning area 59 containing another branch 60, the branch processing operation is performed similar to the normal tracing operation, and the branching point is stored in the branch-crossing memory 134.

The above described operations can also be applied for crossings. More particularly, upon detection of a crossing point two directions thereof are stored and as the detector is returned to the crossing point the curve in one of said two directions is traced. At this time, only the remaining direction is stored in branch-crossing memory 134. As the detector is returned a second time the remaining curve is traced. Further, each time the detector is returned to a crossing point and begins the tracing operation, an information representing the fact that the detector has commenced the tracing operation starting from a crossing point is stored in mode circuit 137. During the scanning operation, whenever the number representing a curve decreases to two the memory stored in the mode circuit is erased, in other words, the condition of the mode circuit 137 is changed.

Where a portion or whole of the curve is closed, during the tracing operation thereof a branching or crossing point which has already been processed may be reached again. Under these conditions two-dimensional vectors representing the distance between a branching or crossing point and a point at which the curve is presently traced are stored in memory units of the branch-crossing memory 134 corresponding to such a branching or crossing point so that the judgment of a closed curve is effected by detecting a zero condition of the vector sum. Where the detector is returned to a branching point after tracing a closed curve, mode circuit 137 is actuated to erase information regarding the branching point that has been stored in the branch-crossing memory 134.

Figure 9:
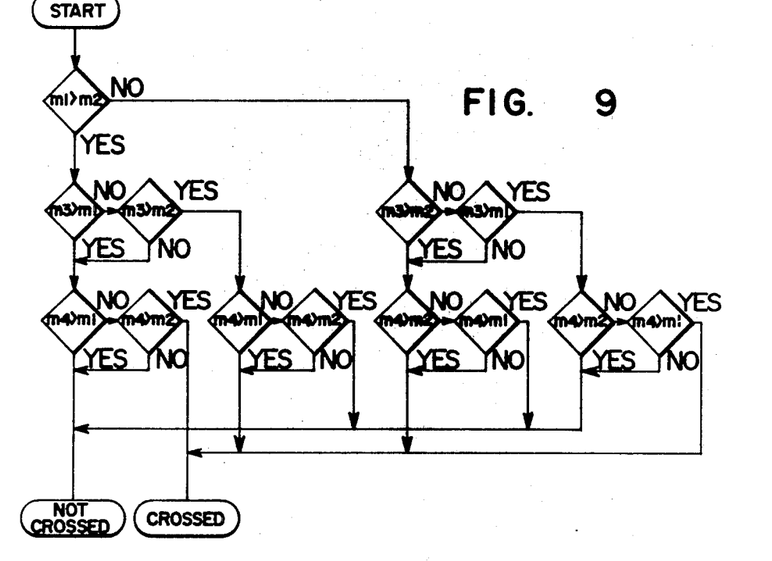
FIG. 9 is a flow chart to explain the operation of the crossing discrimination circuit shown in FIG. 7.
Figure 11:
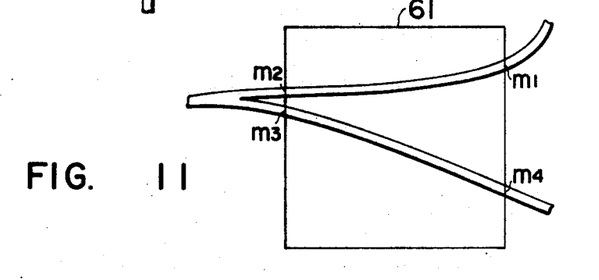
FIG. 11 is a digaram to explain a case wherein four groupes of spots of plotting are detected in one round scanning operation of the detector and the result is utilized to discriminate a crossing and a noncrossing.

Presence of four spots plotted in a scanning area during the tracing operation does not always mean the presence of a crossing point in that area. FIG. 11 shows one example of such a case. In order to assure correct judgement of the presence of a crossing or branching point a crossing judging circuit 141 is provided. The circuit 141 is provided with two input conductors 142 and 143, the former being connected to block counter 136 and the latter to output sides of various memories 124 through 127. The crossing judging circuit 141 functions to determine the phase relationship between inputs supplied over conductor 143 to supply the result to mode circuit 137 over conductor 144 to vary the state of the mode circuit 137.

Where an area 61 shown in FIG. 11 is scanned by detector 21 four spots $m_1$ through $m_4$ are plotted. A spot at substantially the center of these spots is determined and of these spots at the respective centers of respective spots, a spot corresponding to the tracing direction, a spot corresponding to the previous tracing direction or to the tracing forbidding direction and spots corresponding to other directions are stored in memories 124 through 127, respectively in the same manner as above described. Concurrently therewith block counter 136 counts four spots to apply its output to crossing judging circuit 141 and mode circuit 137. In the example illustrated in FIG. 11, assuming that plot $m_1$ represents a direction to be traced, $m_2$ a tracing forbidding direction, and $m_3$ and $m_4$ other directions, the crossing judging circuit 141 will operate according to a flow chart shown in FIG. 9. In this case input conductor 143 to crossing judging circuit 141 is sequentially supplied with outputs from memories 124 through 127. The phase relationship between the outputs is determined by comparing the outputs from these memories. As a consequence, where spots $m_3$ and $m_4$ are closely adjacent there is no crossing point.

While in this embodiment detector 21 is shown as being comprised by an optical detector it will be clear that any one of many other types of detectors including a well known magnetic or electric detector may be used dependent upon the characteristics of the pattern and ink.

Further, to simplify the construction of the driving mechanism the photoelectric converting element and the source of light may be held stationary at a point spaced apart from a read out head movable along the surface of a sheet of drawing and connected to the head through light guides comprised by optical fiber glass.

Where a single detector 21 is used as above described it is necessary to sequentially move the detector during scanning operation. Where a plurality of detectors, each disposed on one side of a square, are sequentially operated it becomes unnecessary to mechanically move a single detector to perform the round scanning operation.

Further, it is not always necessary to cause a detector to perform a round scanning operation around the periphery of a square, the scanning area may take other shapes such as rectangle, hexagon, octagon or circular configuration.

What is claimed is:

1. In an automatic curve tracing system comprising a detector for performing a round scanning operation along the periphery of an area containing a curve to be traced to provide information regarding the presence or absence and the position of said curve, means responsive to said information to move said detector in a predetermined direction over a predetermined distance to trace said curve and means to alternately repeat said round scanning operation and said movement of said detector to continuously scan said curve: apparatus for judging a branch and or crossing comprising
    means for storing the tracing direction and tracing forbidden directions as a result of storing the detected positions of said curve on said successive round scans;
    means for detecting a branch or crossing as the presence of said curve at more than two positions of any scan;
    means for storing as branch information the position and direction of points at a detected branch or crossing not determined as tracing and tracing forbidden directions; and
    means responsive to the continued detection of said more than two positions of any scan for preventing storage on subsequent scans of the same said branch information.

2. The apparatus according to claim 1 wherein said detector for performing a round scanning operation includes means for sensing a predetermined line spot pattern on the periphery of said area to detect as plotted points spots which fall on said curve, and said means for detecting a branch or crossing is operative to determine the presence or absence of said branch and or crossing according to the number of said spots falling on said curve in one round scanning operation.

3. The apparatus according to claim 1 which further comprises
    means responsive to the end of a continuous curve tracing in the tracing direction for returning said detector to the stored location of said branch information; and
    means for selecting the stored direction of one of said points stored as branch information as the next tracing direction.

4. An automatic curve tracing system comprising a detector for performing a round scanning operation along the periphery of an area containing a curve to be traced to provide information regarding the presence or absence and the position of said curve, means responsive to said information to move said detector in a predetermined direction over a predetermined distance to trace said curve, means to alternately repeat said round scanning operation and said movement of said detector to continuously scan said curve, means to return said detector to a branching or crossing point when it completes the tracing operation in said predetermined direction after it has reached a branch or crossing and to cause said detector to begin to trace said branched curve or crossing curve, means to store information corresponding to the commencement of said tracing operation of said detector in the direction of said branched curve or crossing curve, means to erase said information when the scanning area does not contain said branching point or crossing point, and means to integrate the two-dimensional vectors relating the distance between said branching point or crossing point and a point at which the scanning operation of said detector is being performed.

5. The system according to claim 4 which further includes means to process another branch or crossing newly encountered by said detector while it is tracing a branched curve or a crossing curve.

6. An automatic curve tracing system comprising a detector for performing a round scanning operation along the periphery of an area containing a curve to be traced to provide an information regarding the presence or absence and the position of said curve, means responsive to said information to move said detector in a predetermined direction over a predetermined direction to trace said curve, means to alternately repeat said round scanning operation and said movement of said detector to continuously scan said curve, and means to detect a crossing contained in said curve, said last mentioned means including means to determine a representative spot among a group of spots plotted during each round scanning operation, means to determine a direction to be traced and a direction in which the tracing is to be forbidden from said representative spots, and means to judge the phase relationship between said representative spots to determine said crossing point.

7. The automatic tracing system according to claim 6 which further includes means to discriminate the magnitude of the information regarding said representative spots.

* * * * *